E. P. CLARK.
MANIFOLD VALVE LOCK.
APPLICATION FILED MAY 11, 1917.
1,273,740.
Patented July 23, 1918.
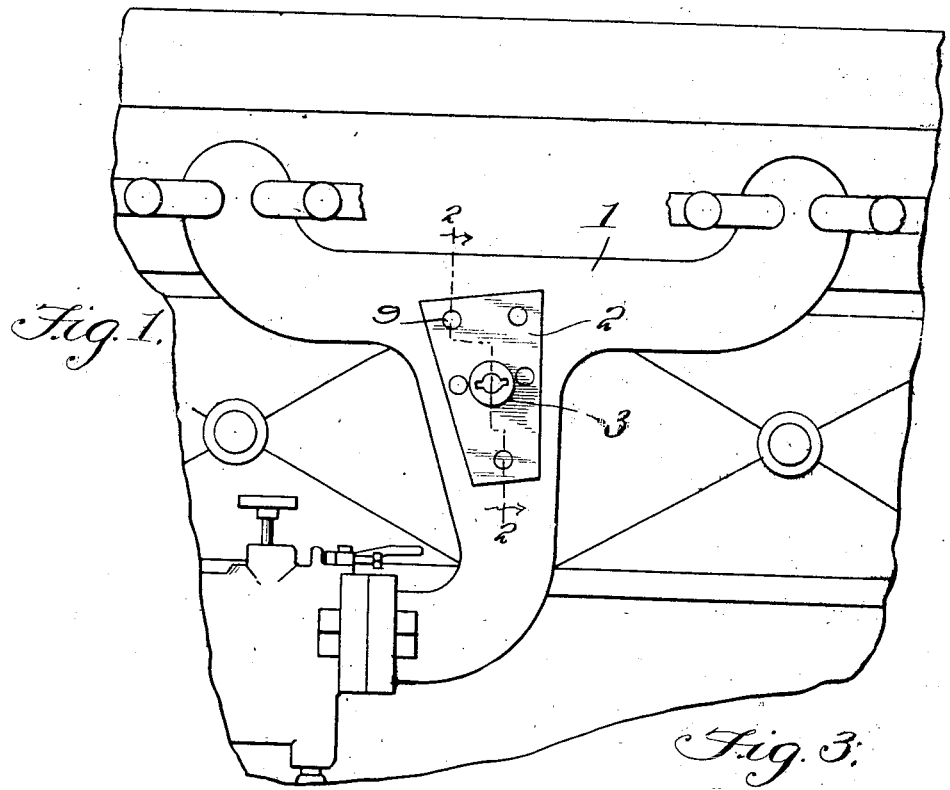
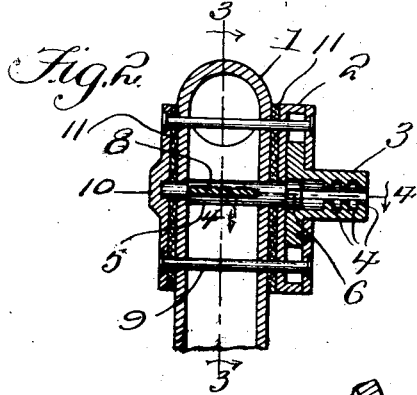
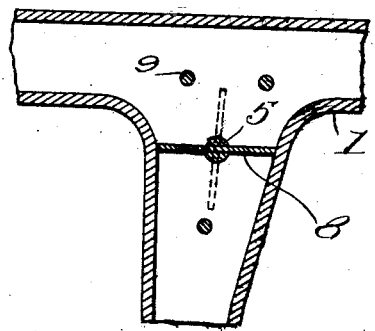
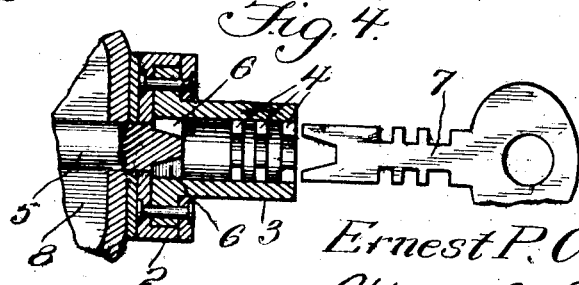
WITNESSES
INVENTOR
Ernest P. Clark
BY Victor J. Evans
ATTORNEY

UNITED STATES PATENT OFFICE.

ERNEST P. CLARK, OF MORRISTON, FLORIDA.

MANIFOLD VALVE-LOCK.

1,273,740.  Specification of Letters Patent.  Patented July 23, 1918.

Application filed May 11, 1917. Serial No. 168,036.

*To all whom it may concern:*

Be it known that I, ERNEST P. CLARK, a citizen of the United States, residing at Morriston, in the county of Levy and State of Florida, have invented new and useful Improvements in Manifold Valve-Locks, of which the following is a specification.

This invention relates to valve locks especially adapted to be applied to the manifold pipe of an automobile or a similar machine and it consists in the novel features hereinafter described and claimed.

An object of the invention is to provide a lock of the character stated which is of simple and durable structure and which includes as an operative element thereof the shaft of a valve which is located in the manifold pipe in a manner that when the key is inserted in the lock and turned the valve may be swung from an open to a closed position and vice versa.

A prime object of the invention is to provide a simple and efficient means for preventing unauthorized persons from using the machine and consequently when the owner of the machine leaves the same he may move the valve to a closed position and carry the key with him and hence he is reasonably assured that the machine will not be used in his absence.

In the accompanying drawings:—

Figure 1 is side view of the manifold pipe of an automobile machine showing the valve lock applied.

Fig. 2 is a sectional view of the lock cut on the line 2—2 of Fig. 1.

Fig. 3 is a section through the manifold of the device cut on the line 3—3 of Fig. 2.

Fig. 4 is a horizontal sectional view of the lock.

As illustrated in the accompanying drawing the manifold pipe 1 is of usual form and pattern and one end thereof is connected with the carbureter of the machine while the branches of the said pipe are connected with the engine cylinders in a usual manner. A lock casing 2 is positioned at the side of the pipe 1 at a point just below the inner ends of the branches of the said manifold and the casing 2 is provided with a barrel 3 in which may be located a series of ridges 4. A shaft 5 is journaled in the manifold pipe 1 and one end of the said shaft enters the lock casing 2 and is provided with depressions 6 adapted to receive the end portions of a key 7 when the same is inserted in the barrel 3 of the lock casing 2. A valve 8 is carried by the shaft 1 and may be moved to a position transverse of the pipe 1 whereby the passageway through the said pipe is interrupted or the said valve may be moved to a position at right angles to the passageway through the pipe and hence the explosive mixture may pass through the pipe when the valve is in an open position.

The casing 2 is secured in position upon the pipe 1 by means of bolts or rivets 9 which pass transversely through the casing and pipe and through a plate 10 mounted at the inner side of the pipe 1. Packings 11 of asbestos or other suitable material are interposed between the casing 2 and the plate 10 and the pipe 1. One end of the shaft 5 is housed in the barrel 3 and the other end of the said shaft is covered by the plate 10, thus sealing the joint where the shaft 5 passes through the sides of the pipe 1. By this arrangement it would be difficult for an unauthorized person to tamper with the lock without using a key to open the valve 8, for if the securing devices 9 are broken or cut they would work or fall out of their openings in the pipe 1 and thus admit too much air.

The device may be applied to a manifold pipe by drilling holes through the same, applying the plate 10, casing 2 and the packings to the opposite sides thereof, then passing the bolts 9 through the said holes and the said parts and upsetting the ends of the bolts as shown in Fig. 2.

When the owner of the machine leaves the same he inserts the key 7 in the barrel 3 and lock casing 2 and the said key is turned whereby the shaft 5 is rotated and the valve 8 is moved to a closed position within the manifold pipe 1. When the owner leaves the machine he carries the key with him and consequently he is reasonably assured that the machine will not be used in his absence. When it is desired to use the machine the key 7 is inserted in the barrel 3 and lock casing 2 and is turned whereby the shaft 5 is rotated and the valve 8 is moved from a closed to an open position in the manifold pipe 1 and hence the passageway through the said pipe is opened and the explosive mixture may flow freely through the same.

In assembling the parts upon the manifold pipe 1 a section may be removed from the said pipe by using a hacksaw or other suitable implement whereby an opening is made in the pipe and the valve 3 may be inserted in the pipe through the said opening and into the shaft 5. After this has been done the said section of the pipe is replaced upon the manifold pipe and is secured thereto by brazing, solder or other suitable means.

From the foregoing description taken in conjunction with the accompanying drawing, it will be seen that a manifold valve lock of simple and durable structure is provided and that the same may be readily manipulated to assure an owner of an automobile machine that the same will not be used by an unauthorized person in his absence.

Having described the invention what is claimed is:—

In combination with a manifold pipe, a lock casing mounted thereon at one side, a plate mounted at the opposite side of the pipe, securing devices passing transversely through the casing, pipe and plate, a key for operating the lock, a shaft journaled in the pipe and having one end portion located in the lock casing and which is provided with depressions adapted to receive a part of the key, the other end of the shaft being covered by the plate, and a valve mounted on the shaft and adapted to close transversely across the manifold pipe.

In testimony whereof I affix my signature.

ERNEST P. CLARK.